US012130726B2

(12) United States Patent
Liu (10) Patent No.: US 12,130,726 B2
(45) Date of Patent: Oct. 29, 2024

(54) SECURELY MODIFYING ACCESS TO A DEBUG PORT

(71) Applicant: Micron Technology, Inc., Boise, ID (US)

(72) Inventor: Zhan Liu, Cupertino, CA (US)

(73) Assignee: Micron Technology, Inc., Boise, ID (US)

( * ) Notice: Subject to any disclaimer, the term of this patent is extended or adjusted under 35 U.S.C. 154(b) by 252 days.

(21) Appl. No.: 17/895,970

(22) Filed: Aug. 25, 2022

(65) Prior Publication Data

US 2024/0070049 A1 Feb. 29, 2024

(51) Int. Cl.
*G06F 11/36* (2006.01)

(52) U.S. Cl.
CPC ...... *G06F 11/3656* (2013.01); *G06F 11/3636* (2013.01)

(58) Field of Classification Search
None
See application file for complete search history.

(56) References Cited

U.S. PATENT DOCUMENTS

2020/0311289 A1* 10/2020 Cooper ................ G06F 21/602

\* cited by examiner

*Primary Examiner* — Scott C Sun
(74) *Attorney, Agent, or Firm* — Greenberg Traurig (57) ABSTRACT

In some aspects, the techniques described herein relate to a device including: a debug port; a trusted execution environment (TEE), the TEE storing a public key; and a controller, the controller configured to: receive a command to access the debug port, the command including a signature generated using a private key corresponding to the public key; provide the command to the TEE, wherein the TEE validates the command by validating the signature using the public key to obtain a validation result; and modify access to the debug port based on the validation result.

20 Claims, 7 Drawing Sheets

SECURELY MODIFYING ACCESS TO A DEBUG PORT

FIELD OF THE TECHNOLOGY

At least some embodiments disclosed herein relate generally to memory devices (e.g., semiconductor memory devices) and, in particular, to improvements in cryptographically securing debug ports on such devices.

BACKGROUND

Some memory devices may utilize debug ports during manufacturing as well as for software debugging by an authorized party. To properly secure the device, all other accesses to the debug port should be strictly forbidden. Current solutions to prevent malicious access to debug ports include either disabling debut ports entirely prior to release from manufacturing and/or disabling debug access in the kernel of such devices. Both approaches effectively remove debug capability after a device is released from manufacturing.

DETAILED DESCRIPTION

The example embodiments are directed towards securing access to a debug port of a computing device. In the various embodiments, access to a debug port is controlled via cryptographic keys. During manufacturing, a public key of a key management server (KMS) is stored in a secure area of the computing device, such as a trusted execution environment (TEE). The KMS can then generate a command to access the debug port (e.g., enable or disable with corresponding access permissions). The KMS signs this command using a private key corresponding to the public key stored in the TEE. In response, the computing device validates the signature and modifies access to the debug port based on the command. In further embodiments, a method for updating the public key in the TEE is also described, which enables temporary authority to access the debug port.

The example embodiments dynamically enable and disable a debug port securely; therefore, even final products can retain such debug ports. Using the example embodiments, debug ports can be enabled or disabled remotely, therefore, providing remote debugging capabilities. Further, using the example embodiments, debug ports can be enabled and disabled for boot loaders, and debug port access can be delegated to third parties.

In some aspects, the techniques described herein relate to a device including: a debug port; a trusted execution environment (TEE), the TEE storing a public key; and a controller, the controller configured to receive a command to access the debug port, the command including a signature generated using a private key corresponding to the public key; provide the command to the TEE, wherein the TEE validates the command by validating the signature using the public key to obtain a validation result; and modify access to the debug port based on the validation result.

In some aspects, the techniques described herein relate to a device, wherein validating the command further includes validating one of a monotonic counter or nonce value included in the command.

In some aspects, the techniques described herein relate to a device, wherein the public key and the private key include an Elliptic Curve Digital Signature Algorithm (ECDSA) key pair.

In some aspects, the techniques described herein relate to a device, wherein the public key is written to the TEE during the manufacturing of the device.

In some aspects, the techniques described herein relate to a device, wherein the command to access a debug port includes a command to enable a debug port or a command to disable a debug port.

In some aspects, the techniques described herein relate to a device, wherein the command further includes a set of access permissions for accessing the debug port.

In some aspects, the techniques described herein relate to a device, wherein the TEE further includes a register and modifying access to the debug port includes updating the register based on the command.

In some aspects, the techniques described herein relate to a device, wherein updating a register based on the command includes updating bits of the register based on the set of access permissions.

In some aspects, the techniques described herein relate to a device, wherein the controller is further configured to replace the public key with a new public key included in a digital certificate signed using the private key.

In some aspects, the techniques described herein relate to a method including: receiving, by a controller of a computing device, a command to access a debug port, the command including a signature generated using a private key; validating, via a trusted execution environment (TEE), the command by validating the signature using a public key stored in the TEE to obtain a validation result; and modifying, by the controller, access to the debug port based on the validation result.

In some aspects, the techniques described herein relate to a method, wherein validating the command further includes validating one of a monotonic counter or nonce value included in the command.

In some aspects, the techniques described herein relate to a method, wherein the public key and the private key include an Elliptic Curve Digital Signature Algorithm (ECDSA) key pair.

In some aspects, the techniques described herein relate to a method, wherein the public key is written to the TEE during the manufacturing of the computing device.

In some aspects, the techniques described herein relate to a method, wherein the command to access a debug port includes a command to enable a debug port or a command to disable a debug port.

In some aspects, the techniques described herein relate to a method, wherein the command further includes a set of access permissions for accessing the debug port.

In some aspects, the techniques described herein relate to a method, wherein modifying access to the debug port includes updating a register based on the command.

In some aspects, the techniques described herein relate to a method, wherein updating a register based on the command includes updating bits of the register based on the set of access permissions.

In some aspects, the techniques described herein relate to a method, further including replacing the public key with a new public key included in a digital certificate signed using the private key.

In some aspects, the techniques described herein relate to a non-transitory computer-readable storage medium for tangibly storing computer program instructions capable of being executed by a computer processor, the computer program instructions defining steps of: receiving, by a controller of a computing device, a command to access a debug port, the command including a signature generated using a private key; validating, via a trusted execution environment (TEE), the command by validating the signature using a public key stored in the TEE to obtain a validation result; and modifying, by the controller, access to the debug port based on the validation result.

In some aspects, the techniques described herein relate to a non-transitory computer-readable storage medium, wherein the command further includes a set of access permissions for accessing the debug port and modifying access to the debug port includes updating a register based on the command, wherein bits of the register are updated based on the set of access permissions.

Figure 1:
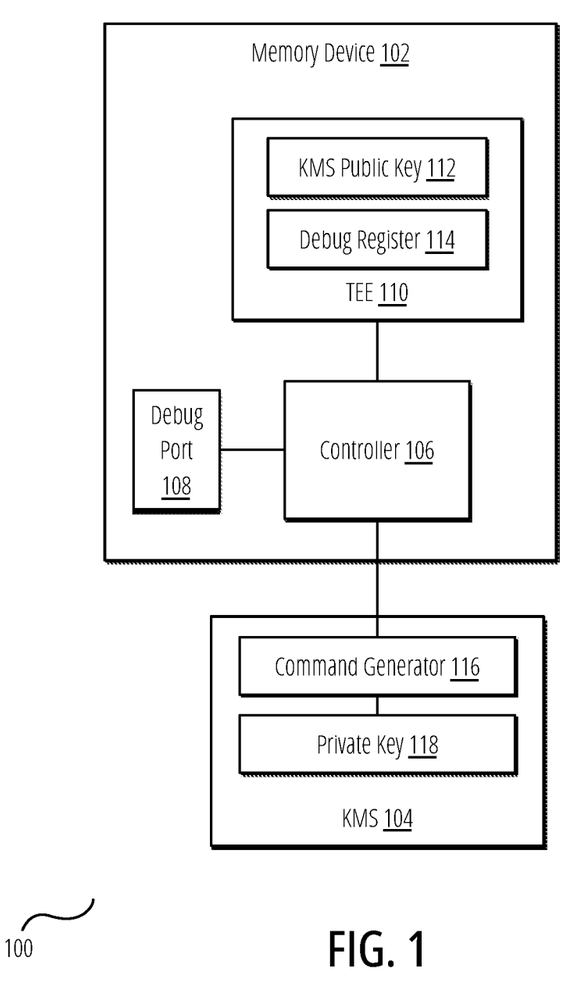
FIG. 1 is a block diagram of a computing system including a memory device having a secure debug port.

FIG. 1 is a block diagram of a computing system including a memory device having a secure debug port.

In an implementation, a computing system 100 includes a memory device 102 and a key management server 104. The memory device 102 may be part of a larger computing device (not illustrated in FIG. 1 but depicted in FIGS. 6 and 7). Memory device 102 is communicatively coupled to the key management server 104 either directly or via an intermediary host device or processor.

The key management server 104 stores a private key 118 and generates signed debug commands via a command generator 116. The key management server 104 can include further components to handle network requests, validation of users, etc., which are all non-limiting and may be built using standard components (e.g., application servers, databases, etc.).

Memory device 102 includes a controller to receive commands and provide access to a debug port 108. Debug port 108 may comprise a physical or software-defined port of the memory device 102 that enables certain sensitive access to the memory device 102 for debugging or troubleshooting. Memory device 102 also includes a TEE 110 or similar type of secure computing environment that can prevent unauthorized access to contents therein. TEE 110 may also perform various cryptographic operations such as signature validation.

As illustrated, the TEE 110 may include a debug register 114 dedicated to controlling the operation of debug port 108. Although a single register is illustrated, the debug register 114 may be made up of multiple registers. In some implementations, the debug register 114 can be situated within the TEE 110, and access to the debug port 108 may be mediated by the TEE 110 (based on the value in debug register 114). In other implementations, debug register 114 may be outside the TEE 110 (but within memory device 102) and accessible by the controller 106. In these implementations, debug register 114 may be configured to only be writable by the TEE 110 and only readable to another device (i.e., controller 106).

TEE 110 also includes a server public key 112. This server public key 112 can be a key generated by key management server 104 and written to the TEE 110 during manufacturing. As will be discussed, in some implementations, server public key 112 can be replaced with a new public key generated by a third party.

Various operations of the computing system 100 are briefly described herein, and further reference is made to FIG. 2 through FIG. 5. As discussed, the key management server 104 can generate an asymmetric key pair and write the server public key 112 to the TEE 110 during manufacturing. Then, the key management server 104 can generate and sign debug commands that control access to the debug port 108. The key management server 104 can transmit these commands (ultimately) to controller 106, which can validate the signature of the debug commands using the TEE 110. If the TEE 110 validates the signature, it updates the debug register 114 to enable, disable, and configure the debug port 108 according to parameters in the debug command. Details of these operations are provided in FIGS. 2 and 3. Further, in some implementations, the key management server 104 can generate a digital certificate that includes a new public key to replace the server public key 112. The key management server 104 can transmit this digital certificate to controller 106, which can validate the digital certificate using the current server public key 112 and then replace the server public key 112 if the digital certificate is valid. Ultimately, the TEE 110 may revert the change in public key when the digital certificate expires, returning server public key 112 to a designated location. Details of these operations are provided in FIGS. 4 and 5.

Figure 2:
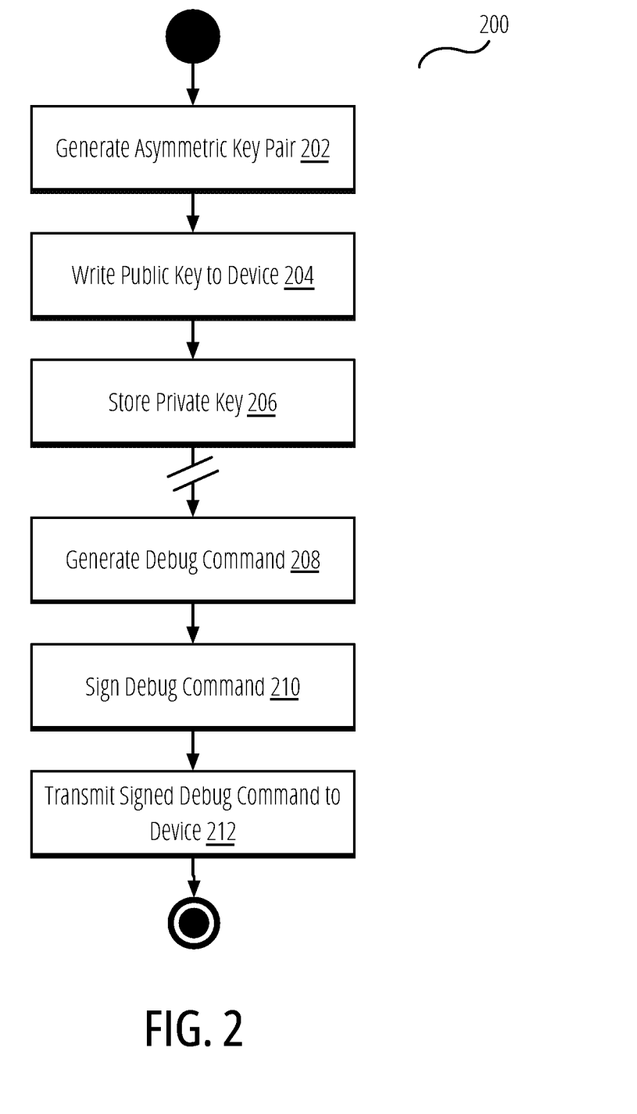
FIG. 2 is a flow diagram illustrating a key generation process.

FIG. 2 is a flow diagram illustrating a key generation process. In some implementations, a manufacturer alone or in combination with a KMS can perform method 200.

In step 202, method 200 can include generating an asymmetric key pair.

In some implementations, the asymmetric key pair can include a public key portion and a private key portion. Various algorithms can be used to generate an asymmetric key pair, including, but not limited to, Rivest-Shamir-Adleman (RSA), Elliptic Curve Digital Signature Algorithm ECDSA), or similar algorithms. The specific choice of key generation algorithm is not limiting, and any such public-key infrastructure (PKI) algorithm that can generate an asymmetric key pair may be used. In some implementations, a manufacturer may generate the asymmetric key pair. In other implementations, a KMS may generate the asymmetric key pair and return the asymmetric key pair to the manufacturer for further processing. As used herein, the asymmetric key pair is referred to as the server key pair, while the public key portion and private key portions are referred to as the server public key and server private key, respectively.

In step 204, method 200 can include writing the server public key to a memory device.

In some implementations, step 204 can be performed in a secure manufacturing environment. As such, step 204 can include writing or otherwise persisting the server public key portion of the asymmetric key pair to a secure region of the memory device. In some implementations, this secure region can be a write-protected region of non-volatile memory (e.g., NAND Flash). In other implementations, the secure region can be a storage area within a TEE or a similar type of secure processing portion of the memory device. In general, step 204 includes writing the server public key in such a way that unauthorized users or software cannot access the server public key without holding the server private key, as will be discussed.

In step 206, method 200 can include storing the server private key.

In some implementations, a manufacturer can maintain a secure storage device (e.g., HSM) to store the server private key. In other implementations, the manufacturer can provide the server private key to a KMS for secure storage (e.g., in an HSM). In other implementations, if the KMS generates the asymmetric key pair, the KMS may retain the server private key while providing the server public key to the manufacturer. In some implementations, step 206 can further include storing a unique identifier (UID) of the memory device along with the server private key. For example, step 206 can include storing the server private key and UID in an associative storage structure (e.g., hash, key-value store, etc.) to enable retrieval of a server private key in response to a UID. Similarly, method 200 can include storing the server public key in a similar manner (i.e., associated with a UID).

After step 206, a memory device may be released from manufacturing and provided to a downstream user to the memory device. As such, time may pass between step 206 and step 208, as illustrated by the broken arrow. At some point after step 206, method 200 may resume at step 208.

In step 208, method 200 generates a debug command.

In some implementations, method 200 may generate a debug command in response to a request from a user of the memory device. In some implementations, the user may authenticate themselves before step 208 executes, ensuring that the user is authorized to receive a debug command. In some implementations, method 200 maintains a mapping of UIDs to customers and can thus validate requests for a debug command based on this mapping. In other implementations, the user can provide a digital certificate or other cryptographically identifying data to validate their authority.

The debug command can include a command indicating whether a debug port should be enabled or disabled. The specific format of such a command is not limiting and may vary based on the instruction set of the memory device. As an example, the command can include an opcode and one or more parameters. These parameters can include a Boolean setting (i.e., enabled/disabled). Further, in some implementations, the parameters can include configuration parameters of the debug port, some examples of which are provided herein. In general, the configuration parameters may represent a set of access permissions for accessing the debug port.

As a first example, the configuration parameters can include a run-time control which allows an external debug tool to start and stop the processor, modify registers, and single-step (execute a single assembly instruction). As a second example, the configuration parameters can include a memory access parameter which allows an external debug tool to read and write memory. The access can be either normal access or on-the-fly access in which case the access is performed while the processor is running. As a third example, the configuration parameters can include breakpoints which allow an external debug tool to halt execution when a specified event (breakpoint) has occurred. The event can be specified as code execution at a specified address or as a data access (read or write) to a specified address with a specified value. Watchpoints are a similar concept, and however, when a watchpoint occurs, a message is sent to the debug tool (as opposed to halting the processor). As a fourth example, the configuration parameters can include an instruction or program trace setting, which allows an external debug to trace program execution and by this having full reconstruction of the program flow. As a fifth example, the configuration parameters can include a data trace setting which allows an external debug tool to track real-time data accesses to memory locations. As a sixth example, the configuration parameters can include an ownership trace feature which allows an external debug tool to identify (real-time) the currently executing process or task of an operating system. As a seventh example, the configuration parameters can include a memory substitution and port replacement parameter which allows internal memory or port accesses to be implemented over the auxiliary debug port. For example, this feature can be used to implement ROM patching, that is, instead of reading on-chip ROM, the instruction will be fetched from the debug tool via the auxiliary debug port.

Each of the parameters above can be represented via a Boolean value, enabling or disabling specific parameters. As a further example, the enable/disable setting can be represented as another parameter, and the entire parameter set can consist of eight bits. In some implementations, the command can include setting a register value to this value. For example, "MOV DEB_REG 0x8C," where the "0x8C" represents the bitmap "10001100," setting the various configuration parameters and enable/disable flag discussed above. Further, in some embodiments, a monotonic counter value can be read and inserted into the command to prevent replay attacks.

In step 210, method 200 can include signing the debug command.

In some implementations, method 200 can retrieve the server private key (either stored locally or via a KMS). In some implementations, method 200 uses the UID of the memory device (as validated in step 208) to identify the proper server key and generates a digital signature using the server private key as the key and the debug command as the data to sign. As discussed, an algorithm such as an RSA or ECDSA algorithm can be used to generate such a signature, and the specific algorithm is not limiting but should be consistent with the asymmetric key pair generated in step 202.

In step 212, method 200 can include transmitting the debug command and signature (referred to as the signed command) to the memory device.

In some implementations, method 200 can transmit the signed command directly to the memory device. In other implementations, method 200 can transmit the signed command to the memory device via a host device or processor which requested the command. As will be discussed next, the memory device can validate the command and control access to the debug port accordingly.

Figure 3:
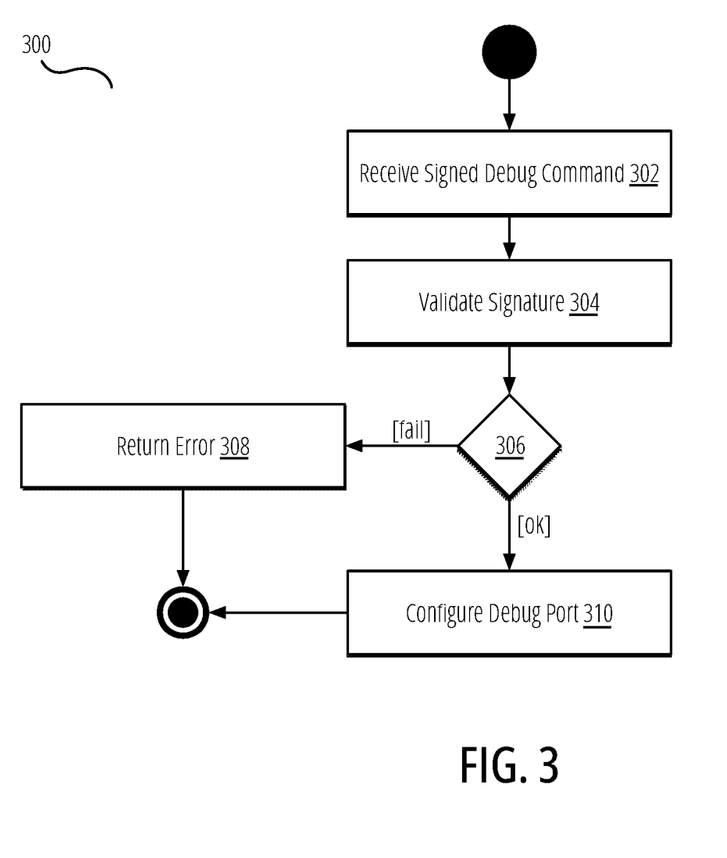
FIG. 3 is a flow diagram illustrating a debug port command processing routine.

FIG. 3 is a flow diagram illustrating a debug port command processing routine. In some implementations, method 300 can be executed by a memory device.

In step 302, method 300 can include receiving a command to access a debug port, the command including a signature generated using the server private key discussed in FIG. 2.

Details of this command and the contents thereof were described in FIG. 2 and, specifically, step 208 of FIG. 2 and are not repeated at length herein. In brief, the debug command can include an enable/disable signal (e.g., bit) and, in some implementations, additional configuration parameters. As discussed, the debug command may take the form of setting a register value to a sequence of bits, each bit representing a set of access permissions for accessing the debug port. In some implementations, method 300 receives the debug command directly from a KMS. Alternatively, or in conjunction with the foregoing, method 300 may receive the debug command from a host processor or host device. In some implementations, step 302 can be executed by the controller of memory device. In other implementations, step 302 can be executed by a TEE or similar secure environment of the memory device directly.

In step 304, method 300 can include validating the command by validating the signature using the public key to obtain a validation result. In some implementations, step 304 can be executed within a TEE or similar environment.

In response to a signed debug command, the TEE can read the server public key stored within the secure region and use the server public key to validate the signature included in the command. In general, standard digital signature validation algorithms can be used to validate the digital signature. Further, in some implementations, step 304 can include validating the monotonic counter value to ensure that the command was not previously received. In such implementations, method 300 may maintain a corresponding monotonic counter value to ensure that the same monotonic counter value is not received (i.e., replayed).

In step 306, method 300 determines if the signature validation was successful or not. If not, method 300 returns an error to the calling device in step 308. As discussed, this device may be a host processor or device or a KMS. In general, the form of the error is not limiting so long as it indicates that the debug port was not modified. By contrast, if the signature validation was successful, method 300 configures the debug port accordingly in step 310.

As discussed above, in some implementations, the debug port may be hardware-controlled. In such an implementation, step 310 can include setting a specific debug register with a value included in the debug command as described previously. In some implementations, a single register can be used and each bit can comprise a binary flag for a given setting. In other implementations, multiple such registers may be used and each register can store a corresponding configuration parameter. In some implementations, these registers can be hardwired to control circuitry controlling access to the debug port. Alternatively, or in conjunction with the foregoing, in some implementations, a software-implemented debug port control mechanism can be used. In such a scenario, the register can be read by a kernel or bootloader to enable, disable, or otherwise modify the access to a debug port via higher-level software.

Figure 4:
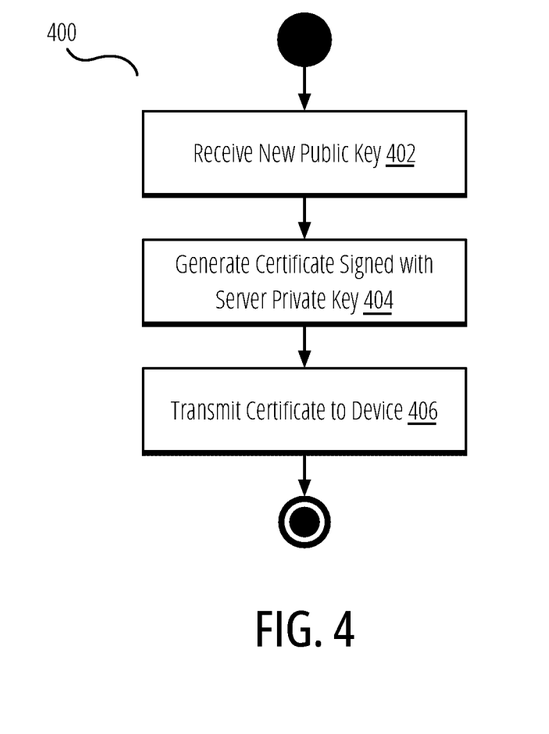
FIG. 4 is a flow diagram illustrating a transfer procedure performed by a key management system.

FIG. 4 is a flow diagram illustrating a transfer procedure performed by a key management system.

In step 402, method 400 can include receiving a new public key. In some implementations, the new public key can be associated with a user and one or more memory devices (e.g., via UID values).

As discussed in FIG. 2, in some implementations, a user device can authenticate with method 400 to validate it's identity with respect to one or more memory devices. In response, method 400 can confirm that a given user is associated with the UIDs of one or more memory devices. If such validation fails, method 400 will end. However, if method 400 can confirm that the user or device transmitting the new public key is associated with a given memory device, it will continue.

In step 404, method 400 can include generating a digital certificate signed using the server private key.

In some implementations, the server private key in step 404 corresponds to the current server public key stored by the memory device. As discussed in FIG. 2, associations between memory devices (UIDs) and server public and private keys can be persistently stored (e.g., by a KMS).

Thus, in step 404, method 400 can identify the current server private key to use for signing based on a UID value (and thus corresponding public key) included along with the new public key transmitted in step 402. In response, method 400 can include generating a digital certificate that includes the new public key. Specifically, in some implementations, method 400 can generate an X.509 certificate that uses the new public key as the "Subject Public Key." Method 400 can then sign the digital certificate using the server private key corresponding to the server public key currently stored by the memory device (and concurrently stored by the KMS). In some implementations, method 400 can include setting other fields of the digital certificate accordingly (e.g., setting a Subject Name field as the name of the user). In some implementations, step 404 can also include explicitly setting the validity period of the digital certificate to a short time period. For example, step 404 can include setting the validity period to one hour from the time of receipt. The specific duration of the validity period is not limiting.

Figure 5:
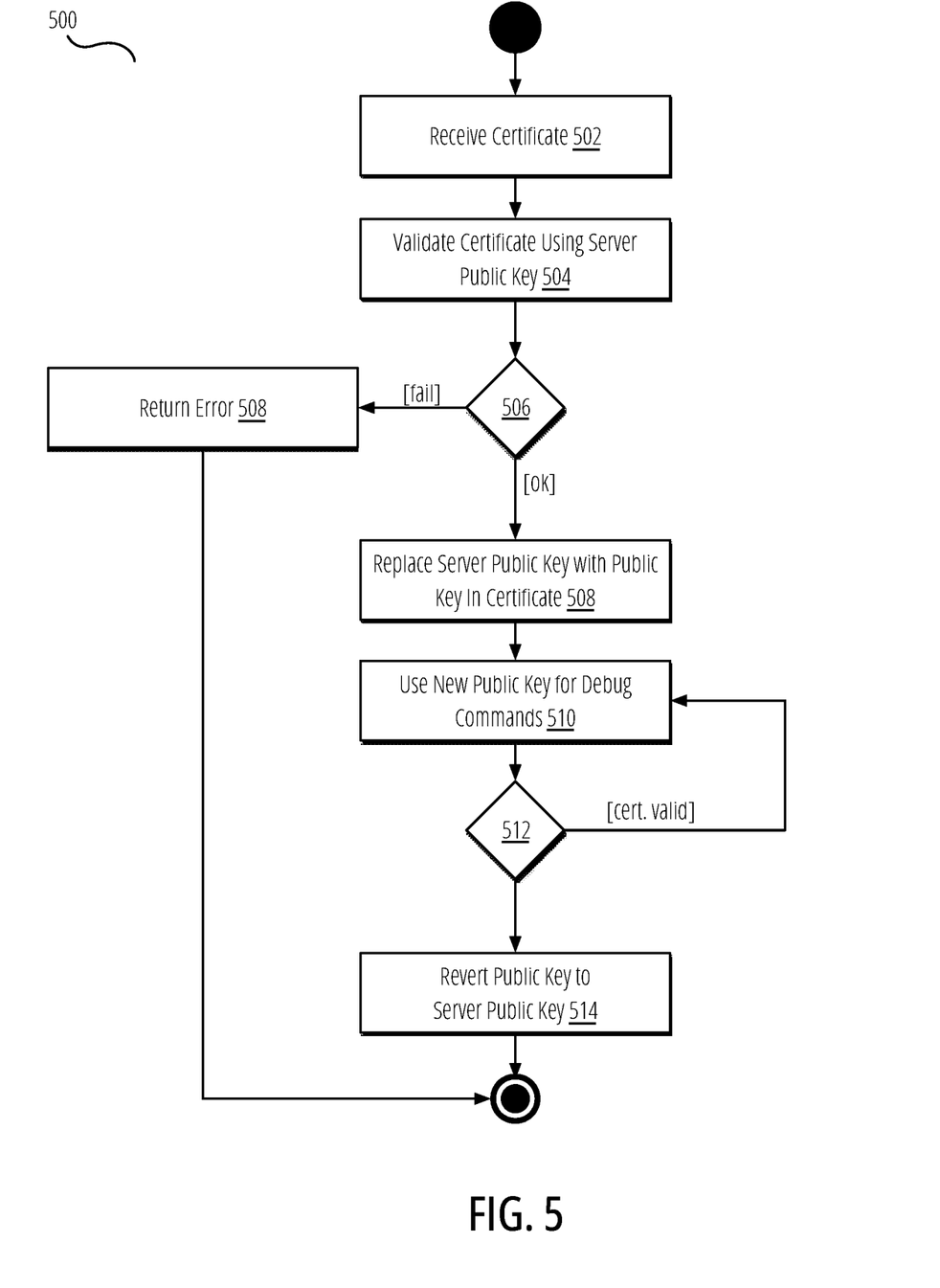
FIG. 5 is a flow diagram illustrating a transfer procedure performed by a memory device.

In step 406, method 400 can include returning the digital certificate to the corresponding memory device. As in step 212, in some implementations, method 400 can transmit the digital certificate directly to the memory device. In other implementations, method 400 can transmit the digital certificate to a host processor or host device for forwarding to the memory device. In response, memory device can execute method 500 described next.

FIG. 5 is a flow diagram illustrating a transfer procedure performed by a memory device.

In step 502, method 500 can include receiving the digital certificate from the KMS or from the KMS via the host processor or device. In some implementations, the memory device, via a controller, can support a command that causes a TEE to attempt to replace a key using a digital certificate, as will be discussed.

In step 504, method 500 can include validating the digital certificate using the currently stored server public key in the memory device.

As discussed, this server public key can be the key generated during manufacturing and securely stored inside a TEE or similar secure environment. In response to receiving a digital certificate, method 500 can include validating the digital signature of the digital certificate using the current server public key. Any well-known digital certificate validation routine can be employed to perform this check and the choice of algorithm is not limiting.

In step 506, method 500 determines if the digital certificate validation was successful or not. If not, method 500 returns an error to the calling device in step 508. As discussed, this device may be a host processor or device or a KMS. In general, the form of the error is not limiting so long as it indicates that the public key was not updated. By contrast, if the digital certificate validation was successful, method 500 can temporarily replace the server public key as will be discussed next in step 510.

In step 510, method 500 can include replacing the server public key with the public key included in the digital certificate.

As discussed in FIG. 4, the public key in the digital certificate can be set by any user authorized to manage the memory device (as validated in FIG. 4). Any type of public key can be used (e.g., ECDSA, RSA, etc.). Cryptographic keys can be used to establish ownership. As such, when the digital certificate is validate using the server public key it can confirm that the server generated the digital certificate and thus the included data was validated by the server (i.e., KMS). As such, method 500 can trust the public key in the digital certificate. Thus, in response, method 500 can include using the public key for future debug command validations in step 510. In some implementations, method 500 can replace the current server public key with the new public key in the digital certificate while retaining a copy of the current server public key for future use, as will be discussed. In other implementations, the current server public key can be discarded, thus effectively transferring complete ownership of the debug port functionality to the holder of the private key corresponding to the new public key.

As part of step 510, a memory device may execute method 300 again. However, in this scenario, the holder of the private key corresponding to the new public key may self-sign the debug command using its own private key. Since the TEE now uses the new public key as the validation key, the holder of the new private key can enable, disable, and configure the debug port without relying on a KMS or other third-party to sign such commands.

In step 512, method 500 can include determining if the certificate is valid. In some implementations, step 512 (and step 514) can be bypassed if the replacement of keys is permanent. However, in other implementations, the replacement of the server public key with the new public key may be temporary. In these implementations, the validity period of the digital certificate can be used as a timer to determine how long to use the new public key as the validation key in method 300. Other mechanisms (e.g., a fixed duration timer) may be used. In general, the use of a validity period enables a temporary transfer of control to the owner of the new public key while ensure that such control does not "leak" beyond the required time for using the debug port. As such, the validity period can act as a backstop to ensure that access to the debug port is not unintentionally exposed. While the digital certificate is valid, method 500 continues to execute step 510. However, when the validity period ends, method 500 proceeds to step 514

In step 514 method 500 can include reverting the new public key to the server public key.

As discussed, during step 508, method 500 can move the server public key to a temporary location. In step 514 method 500 can completely discard the new public key and move the server public key back to a preconfigured location for use in method 300. As such, after step 514 method 300 will utilize the server (e.g., KMS) public key for validating signatures of debug commands.

Figure 6:
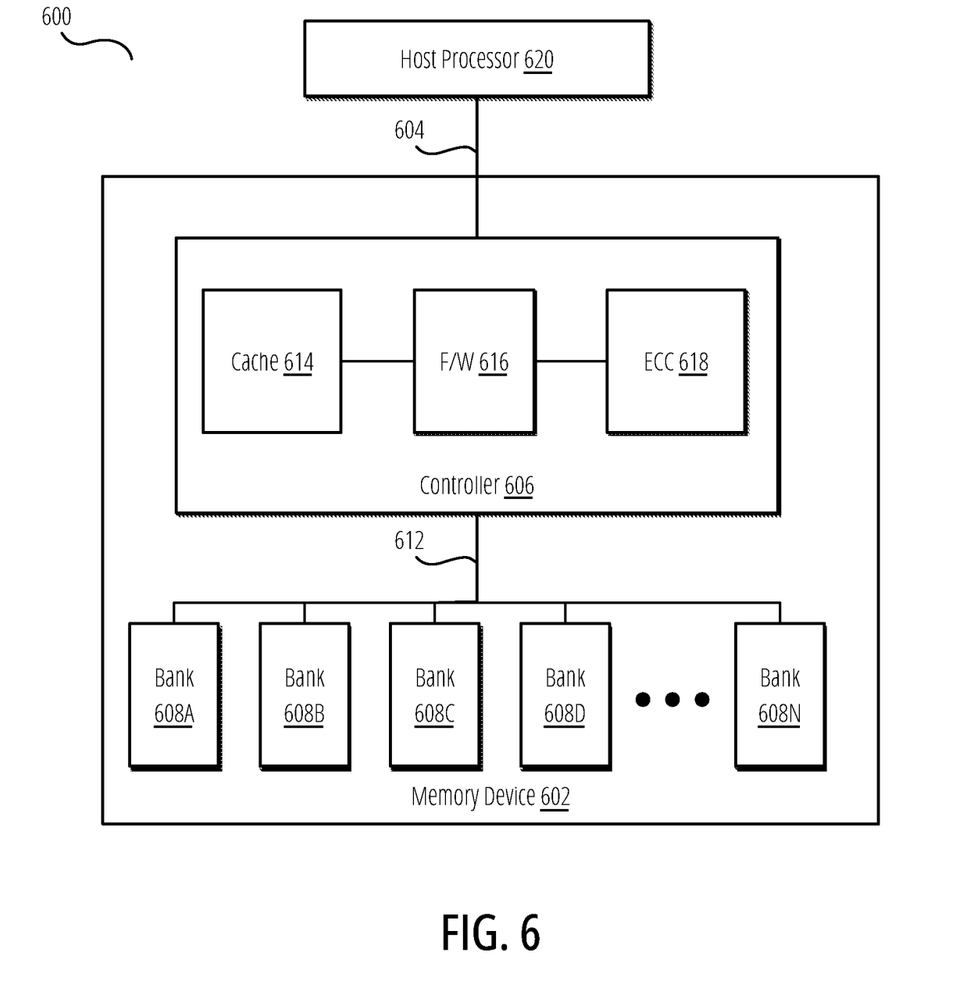
FIG. 6 is a block diagram illustrating a computing system according to some embodiments of the disclosure.

FIG. 6 is a block diagram illustrating a computing system according to some embodiments of the disclosure.

As illustrated in FIG. 6, a computing system 600 includes a host processor 620 communicatively coupled to a memory device 602 via a bus 604. The memory device 602 comprises a controller 606 communicatively coupled to one or more memory banks (e.g., bank 608A, bank 608B, bank 608C, bank 608D, bank 608N, etc.) forming a memory array via a interface 612. As illustrated, the controller 606 include es a local cache 614, firmware 616, and an ECC module 618.

In the illustrated embodiment, host processor 620 can comprise any type of computer processor, such as a central processing unit (CPU), graphics processing unit (GPU), or other types of general-purpose or special-purpose computing devices. The host processor 620 includes one or more output ports that allow for the transmission of address, user, and control data between the host processor 620 and the memory device 602. In the illustrated embodiment, this communication is performed over the bus 604. In one embodiment, the bus 604 comprises an input/output (I/O) bus or a similar type of bus.

The memory device 602 is responsible for managing one or more memory banks (e.g., bank 608A, bank 608B, bank 608C, bank 608D, bank 608N, etc.). In one embodiment, the memory banks (e.g., bank 608A, bank 608B, bank 608C, bank 608D, bank 608N, etc.) comprise NAND Flash dies or other configurations of non-volatile memory. In one embodiment, the memory banks (e.g., bank 608A, bank 608B, bank 608C, bank 608D, bank 608N, etc.) comprise a memory array.

The memory banks (e.g., bank 608A, bank 608B, bank 608C, bank 608D, bank 608N, etc.) are managed by the controller 606. In some embodiments, the controller 606 comprises a computing device configured to mediate access to and from banks (e.g., bank 608A, bank 608B, bank 608C, bank 608D, bank 608N, etc.). In one embodiment, the controller 606 comprises an ASIC or other circuitry installed on a printed circuit board housing the memory banks (e.g., bank 608A, bank 608B, bank 608C, bank 608D, bank 608N, etc.). In some embodiments, the controller 606 may be physically separate from the memory banks (e.g., bank 608A, bank 608B, bank 608C, bank 608D, bank 608N, etc.). The controller 606 communicates with the memory banks (e.g., bank 608A, bank 608B, bank 608C, bank 608D, bank 608N, etc.) over the interface 612. In some embodiments, this interface 612 comprises a physically wired (e.g., traced) interface. In other embodiments, the interface 612 comprises a standard bus for communicating with memory banks (e.g., bank 608A, bank 608B, bank 608C, bank 608D, bank 608N, etc.).

The controller 606 comprises various modules including local cache 614, firmware 616 and ECC module 618. In one embodiment, the various modules (e.g., local cache 614, firmware 616 and ECC module 618) comprise various physically distinct modules or circuits. In other embodiments, the modules (e.g., local cache 614, firmware 616 and ECC module 618) may completely (or partially) be implemented in software or firmware.

As illustrated, firmware 616 comprises the core of the controller and manages all operations of the controller 606. The firmware 616 may implement some or all of the methods described above. Specifically, the firmware 616 may implement the methods described in the foregoing figures.

Figure 7:
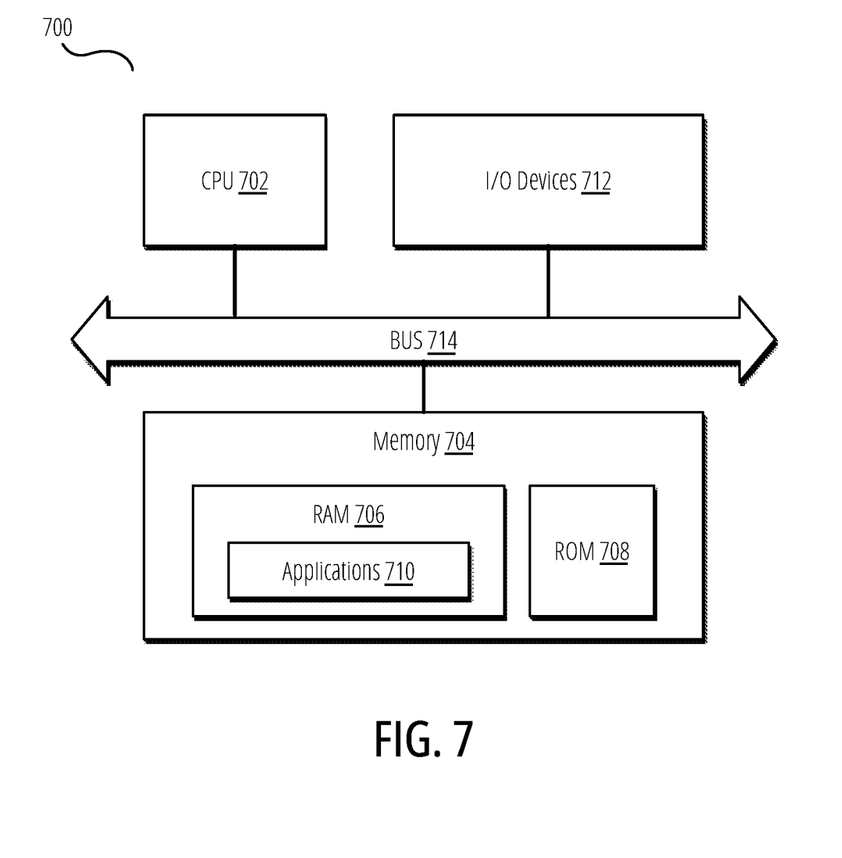
FIG. 7 is a block diagram of a computing device according to some embodiments of the disclosure.

FIG. 7 is a block diagram of a computing device according to some embodiments of the disclosure.

As illustrated, the device 700 includes a processor or central processing unit (CPU) such as CPU 702 in communication with a memory 704 via a bus 714. The device also includes one or more input/output (I/O) or peripheral devices 712. Examples of peripheral devices include, but are not limited to, network interfaces, audio interfaces, display devices, keypads, mice, keyboard, touch screens, illuminators, haptic interfaces, global positioning system (GPS) receivers, cameras, or other optical, thermal, or electromagnetic sensors.

In some embodiments, the CPU 702 may comprise a general-purpose CPU. The CPU 702 may comprise a single-core or multiple-core CPU. The CPU 702 may comprise a system-on-a-chip (SoC) or a similar embedded system. In some embodiments, a graphics processing unit (GPU) may be used in place of, or in combination with, a CPU 702. Memory 704 may comprise a memory system including a dynamic random-access memory (DRAM), static random-access memory (SRAM), Flash (e.g., NAND Flash), or combinations thereof. In one embodiment, the bus 714 may comprise a Peripheral Component Interconnect Express (PCIe) bus. In some embodiments, the bus 714 may comprise multiple busses instead of a single bus.

Memory 704 illustrates an example of a non-transitory computer storage media for the storage of information such as computer-readable instructions, data structures, program modules, or other data. Memory 704 can store a basic input/output system (BIOS) in read-only memory (ROM), such as ROM 708 for controlling the low-level operation of the device. The memory can also store an operating system in random-access memory (RAM) for controlling the operation of the device.

Applications 710 may include computer-executable instructions which, when executed by the device, perform any of the methods (or portions of the methods) described previously in the description of the preceding figures. In some embodiments, the software or programs implementing the method embodiments can be read from a hard disk drive (not illustrated) and temporarily stored in RAM 706 by CPU 702. CPU 702 may then read the software or data from RAM 706, process them, and store them in RAM 706 again.

The device may optionally communicate with a base station (not shown) or directly with another computing device. One or more network interfaces in peripheral devices 712 are sometimes referred to as a transceiver, transceiving device, or network interface card (NIC).

An audio interface in peripheral devices 712 produces and receives audio signals such as the sound of a human voice. For example, an audio interface may be coupled to a speaker and microphone (not shown) to enable telecommunication with others or generate an audio acknowledgment for some action. Displays in peripheral devices 712 may comprise liquid crystal display (LCD), gas plasma, light-emitting diode (LED), or any other type of display device used with a computing device. A display may also include a touch-sensitive screen arranged to receive input from an object such as a stylus or a digit from a human hand.

A keypad in peripheral devices 712 may comprise any input device arranged to receive input from a user. An illuminator in peripheral devices 712 may provide a status indication or provide light. The device can also comprise an input/output interface in peripheral devices 712 for communication with external devices, using communication technologies, such as USB, infrared, Bluetooth®, or the like. A haptic interface in peripheral devices 712 provides tactile feedback to a user of the client device.

A GPS receiver in peripheral devices 712 can determine the physical coordinates of the device on the surface of the Earth, which typically outputs a location as latitude and longitude values. A GPS receiver can also employ other geo-positioning mechanisms, including, but not limited to, triangulation, assisted GPS (AGPS), E-OTD, CI, SAI, ETA, BSS, or the like, to further determine the physical location of the device on the surface of the Earth. In one embodiment, however, the device may communicate through other components, providing other information that may be employed to determine the physical location of the device, including, for example, a media access control (MAC) address, Internet Protocol (IP) address, or the like.

The device may include more or fewer components than those shown in FIG. 7, depending on the deployment or usage of the device. For example, a server computing device, such as a rack-mounted server, may not include audio interfaces, displays, keypads, illuminators, haptic interfaces, Global Positioning System (GPS) receivers, or cameras/sensors. Some devices may include additional components not shown, such as graphics processing unit (GPU) devices, cryptographic co-processors, artificial intelligence (AI) accelerators, or other peripheral devices.

The subject matter disclosed above may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware, or any combination thereof (other than software per se). The preceding detailed description is, therefore, not intended to be taken in a limiting sense.

Throughout the specification and claims, terms may have nuanced meanings suggested or implied in context beyond an explicitly stated meaning. Likewise, the phrase "in an embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms, such as "and," "or," or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures, or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

The present disclosure is described with reference to block diagrams and operational illustrations of methods and devices. It is understood that each block of the block diagrams or operational illustrations, and combinations of blocks in the block diagrams or operational illustrations, can be implemented by means of analog or digital hardware and computer program instructions. These computer program instructions can be provided to a processor of a general-purpose computer to alter its function as detailed herein, a special purpose computer, application-specific integrated circuit (ASIC), or other programmable data processing apparatus, such that the instructions, which execute via the processor of the computer or other programmable data processing apparatus, implement the functions/acts specified in the block diagrams or operational block or blocks. In some alternate implementations, the functions or acts noted in the blocks can occur out of the order noted in the operational illustrations. For example, two blocks shown in succession can in fact be executed substantially concurrently or the blocks can sometimes be executed in the reverse order, depending upon the functionality or acts involved.

These computer program instructions can be provided to a processor of a general purpose computer to alter its function to a special purpose; a special purpose computer; ASIC; or other programmable digital data processing apparatus, such that the instructions, which execute via the processor of the computer or other programmable data processing apparatus, implement the functions or acts specified in the block diagrams or operational block or blocks, thereby transforming their functionality in accordance with embodiments herein.

For the purposes of this disclosure a computer readable medium (or computer-readable storage medium) stores computer data, which data can include computer program code or instructions that are executable by a computer, in machine readable form. By way of example, and not limitation, a computer readable medium may comprise computer readable storage media, for tangible or fixed storage of data, or communication media for transient interpretation of code-containing signals. Computer readable storage media, as used herein, refers to physical or tangible storage (as opposed to signals) and includes without limitation volatile and non-volatile, removable, and non-removable media implemented in any method or technology for the tangible storage of information such as computer-readable instructions, data structures, program modules or other data. Computer readable storage media includes, but is not limited to, RAM, ROM, EPROM, EEPROM, flash memory or other solid-state memory technology, CD-ROM, DVD, or other optical storage, magnetic cassettes, magnetic tape, magnetic disk storage or other magnetic storage devices, or any other physical or material medium which can be used to tangibly store the desired information or data or instructions and which can be accessed by a computer or processor.

For the purposes of this disclosure a module is a software, hardware, or firmware (or combinations thereof) system, process or functionality, or component thereof, that performs or facilitates the processes, features, and/or functions described herein (with or without human interaction or augmentation). A module can include sub-modules. Software components of a module may be stored on a computer readable medium for execution by a processor. Modules may be integral to one or more servers or be loaded and executed by one or more servers. One or more modules may be grouped into an engine or an application.

Those skilled in the art will recognize that the methods and systems of the present disclosure may be implemented in many manners and as such are not to be limited by the foregoing exemplary embodiments and examples. In other words, functional elements being performed by single or multiple components, in various combinations of hardware and software or firmware, and individual functions, may be distributed among software applications at either the client level or server level or both. In this regard, any number of the features of the different embodiments described herein may be combined into single or multiple embodiments, and alternate embodiments having fewer than, or more than, all the features described herein are possible.

Functionality may also be, in whole or in part, distributed among multiple components, in manners now known or to become known. Thus, a myriad of software, hardware, and firmware combinations are possible in achieving the functions, features, interfaces, and preferences described herein. Moreover, the scope of the present disclosure covers conventionally known manners for carrying out the described features and functions and interfaces, as well as those variations and modifications that may be made to the hardware or software or firmware components described herein as would be understood by those skilled in the art now and hereafter.

Furthermore, the embodiments of methods presented and described as flowcharts in this disclosure are provided by way of example to provide a more complete understanding of the technology. The disclosed methods are not limited to the operations and logical flow presented herein. Alternative embodiments are contemplated in which the order of the various operations is altered and in which sub-operations described as being part of a larger operation are performed independently.

While various embodiments have been described for purposes of this disclosure, such embodiments should not be deemed to limit the teaching of this disclosure to those embodiments. Various changes and modifications may be made to the elements and operations described above to obtain a result that remains within the scope of the systems and processes described in this disclosure.

I claim:

1. A device comprising:
a debug port;
a trusted execution environment (TEE), the TEE storing a public key; and
a controller, the controller configured to:
receive a command to access the debug port, the command including a signature generated using a private key corresponding to the public key;
provide the command to the TEE, wherein the TEE validates the command by validating the signature using the public key to obtain a validation result; and
modify access to the debug port based on the validation result.

2. The device of claim 1, wherein validating the command further includes validating one of a monotonic counter or nonce value included in the command.

3. The device of claim 1, wherein the public key and the private key comprise an Elliptic Curve Digital Signature Algorithm (ECDSA) key pair.

4. The device of claim 1, wherein the public key is written to the TEE during manufacturing of the device.

5. The device of claim 1, wherein the command to access a debug port comprises one of a command to enable a debug port or a command to disable a debug port.

6. The device of claim 5, wherein the command further includes a set of access permissions for accessing the debug port.

7. The device of claim 6, wherein the TEE further includes a register and modifying access to the debug port comprises updating the register based on the command.

8. The device of claim 7, wherein updating a register based on the command comprises updating bits of the register based on the set of access permissions.

9. The device of claim 1, wherein the controller is further configured to replace the public key with a new public key included in a digital certificate signed using the private key.

10. A method comprising:
receiving, by a controller of a computing device, a command to access a debug port, the command including a signature generated using a private key;
validating, via a trusted execution environment (TEE), the command by validating the signature using a public key stored in the TEE to obtain a validation result; and
modifying, by the controller, access to the debug port based on the validation result.

11. The method of claim 10, wherein validating the command further includes validating one of a monotonic counter or nonce value included in the command.

12. The method of claim 10, wherein the public key and the private key comprise an Elliptic Curve Digital Signature Algorithm (ECDSA) key pair.

13. The method of claim 10, wherein the public key is written to the TEE during manufacturing of the computing device.

14. The method of claim 10, wherein the command to access a debug port comprises one of a command to enable a debug port or a command to disable a debug port.

15. The method of claim 14, wherein the command further includes a set of access permissions for accessing the debug port.

16. The method of claim 15, wherein modifying access to the debug port comprises updating a register based on the command.

17. The method of claim 16, wherein updating a register based on the command comprises updating bits of the register based on the set of access permissions.

18. The method of claim 10, further comprising replacing the public key with a new public key included in a digital certificate signed using the private key.

19. A non-transitory computer-readable storage medium for tangibly storing computer program instructions capable of being executed by a computer processor, the computer program instructions defining steps of:

receiving, by a controller of a computing device, a command to access a debug port, the command including a signature generated using a private key;

validating, via a trusted execution environment (TEE), the command by validating the signature using a public key stored in the TEE to obtain a validation result; and modifying, by the controller, access to the debug port based on the validation result.

20. The non-transitory computer-readable storage medium of claim 19, wherein the command further includes a set of access permissions for accessing the debug port and modifying access to the debug port comprises updating a register based on the command, wherein bits of the register are updated based on the set of access permissions.

* * * * *